United States Patent [19]

Blomsma et al.

[11] 4,273,470

[45] Jun. 16, 1981

[54] OFFSHORE PRODUCTION RISER WITH FLEXIBLE CONNECTOR

[75] Inventors: Everhard C. Blomsma; Paulus T. M. Holtslag, both of Rijswijk, Netherlands

[73] Assignee: Shell Oil Company, Houston, Tex.

[21] Appl. No.: 3,698

[22] Filed: Jan. 16, 1979

[30] Foreign Application Priority Data

Jan. 20, 1978 [GB] United Kingdom ............... 2383/78

[51] Int. Cl.³ .................... E02D 21/00; E21B 17/01
[52] U.S. Cl. ................................. 405/202; 166/367
[58] Field of Search ............... 405/195, 202; 166/350, 166/367

[56] References Cited

U.S. PATENT DOCUMENTS

| | | | |
|---|---|---|---|
| 3,324,943 | 6/1967 | Price | 166/350 X |
| 3,355,899 | 12/1967 | Koonce et al. | 405/202 |
| 3,670,515 | 6/1972 | Lloyd | 405/202 |
| 3,677,016 | 7/1972 | Garrigus | 405/202 |

*Primary Examiner*—David H. Corbin

[57] ABSTRACT

A central pipe riser support structure is connected to an underwater offshore base member by means of a gimbal joint. Vertical flow lines run parallel to the central riser and are supported by support means connected thereto. The lowermost support of each flow line is formed by a guide sleeve allowing at most a 3° deviation between the central axis of the guide sleeve and the central axis of the flow line.

11 Claims, 9 Drawing Figures

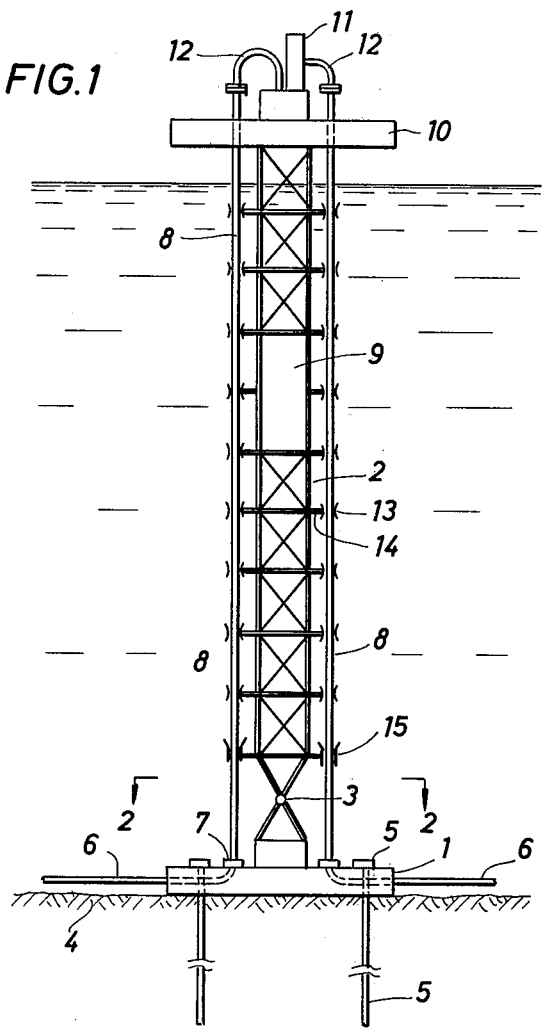
FIG. 1
FIG. 2
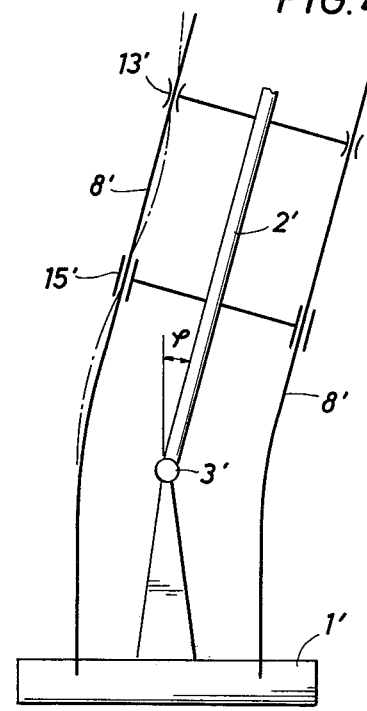
FIG. 4
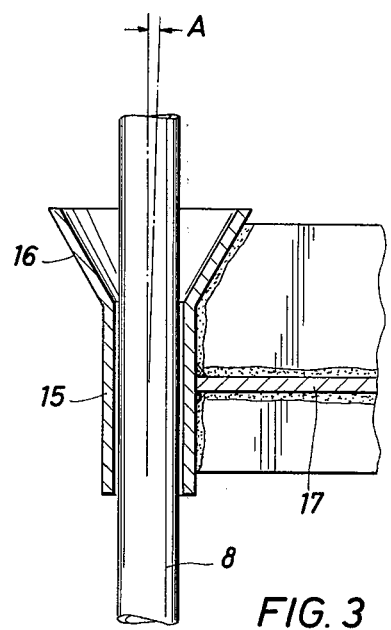
FIG. 3

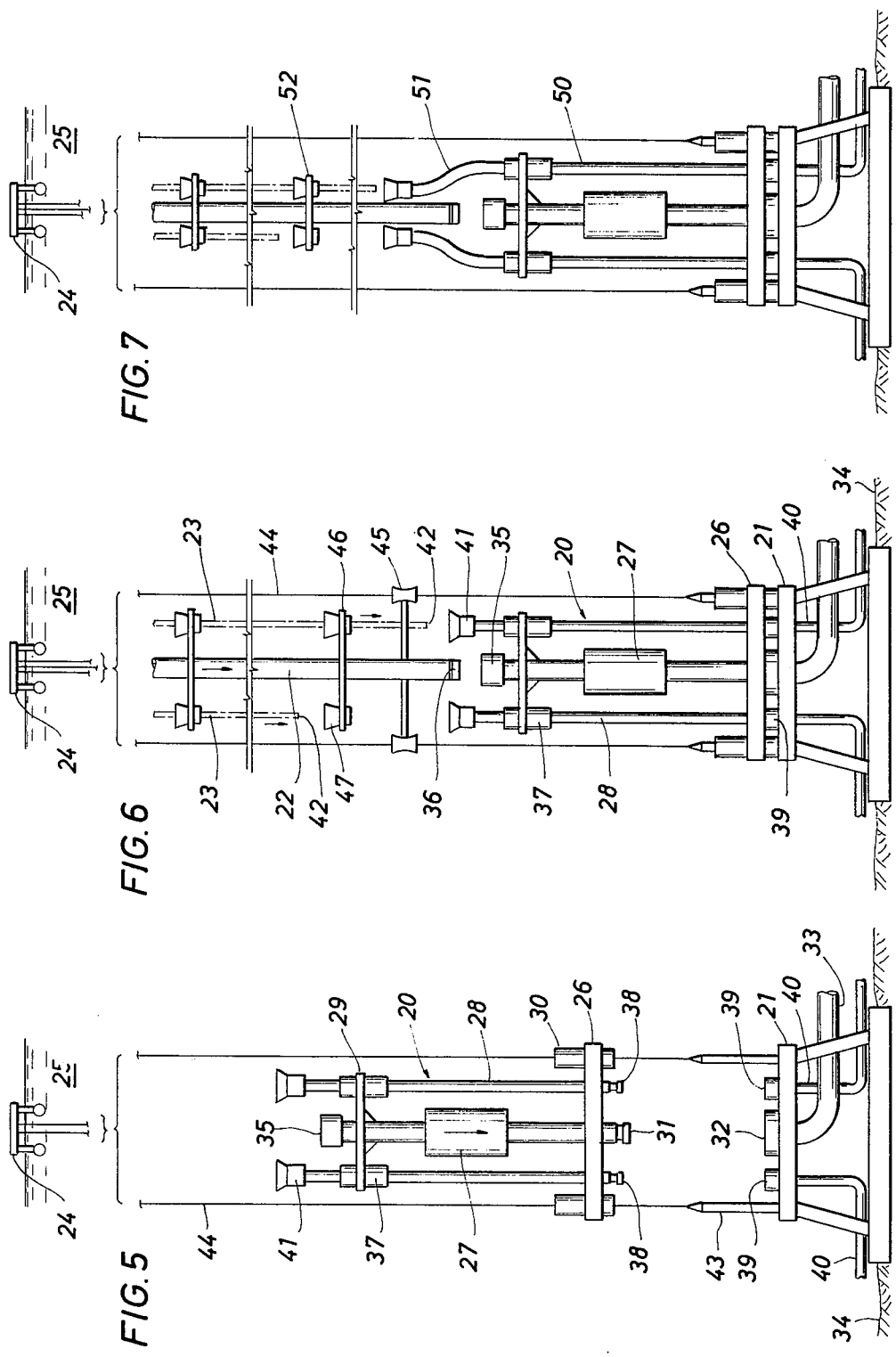

OFFSHORE PRODUCTION RISER WITH FLEXIBLE CONNECTOR

BACKGROUND OF INVENTION

The invention relates to an offshore installation comprising a base carrying at least one fluid conduit and adapted to be placed on the sea bottom, an oblong structure adapted to be substantially vertically positioned in the water, a joint interconnecting said base and the lower end of the structure in a manner allowing the structure to sway in the water when the base is placed on the seabottom, at least one substantially straight pipe coupled at one end thereof to the fluid conduit of the base and extending upwards substantially parallel to the structure, and support means to restrict lateral displacements of the pipe with respect to the structure.

Offshore installations are already in use for various purposes, such as for drilling bore holes for the exploration for and/or the production of fluids (such as oil or gas), servicing of wells, and supporting platforms carrying equipment for treating and handling fluids such as fluids produced by underwater wells or stored in man-made cavities located in formations below the sea bottom. Such apparatus in various forms has been shown in U.K. Patent Specifications Nos. 1,299,699 and 1,277,800, and in U.S. Pat. Nos. 3,553,969-3,522,709-3,154,039 and 3,555,899.

SUMMARY OF THE INVENTION

The oblong structure of the present invention may be provided with buoyancy means and/or be connected to a floating vessel such as a semi-submersible. Alternatively, the upper end of the oblong structure may be supported by a fixed tower tower-like structure anchored to the sea bottom. A platform situated above the sea level may be carried by the oblong structure, the floating vessel or the tower-like structure, and drilling equipment and/or production equipment (such as treating equipment for treating and handling gas and/or oil) may be mounted on such platform.

The pipe extending upwards and substantially parallel to the oblong structure may form part of a fluid transport system. Alternatively, the pipe may form an upward extension of a borehole or well extending in the sea bottom. Drilling operations for drilling the borehole, and recovery operations from the drilled well (for producing fluids such as oil and/or gas) may be carried out through the pipe.

The pivot joint interconnecting the oblong structure and the base may be of any suitable type allowing swaying movements of the oblong structure in all directions under influence of waves, wind or water currents. The base is anchored to the sea bottom to prevent lateral and/or vertical displacement of the base under influence of such swaying action of the oblong structure.

The pipe being connected at one end thereof to the base, and further being supported against lateral displacements with respect to the oblong structure by support means carried by the structure, will be subjected to bending stress over the part thereof extending along the joint. Since the structure will continuously be swaying around the vertical position thereof, the bending stress will vary in magnitude and direction during nearly the whole life of the offshore installation, and fatigue of the material of the pipe part extending along the joint may prematurely lead to failure of the pipe.

It is an object of the invention to minimize the maximum bending stress that may be developed in the pipe during the swaying of the oblong structure, in order to increase the span of operative life of the pipe or pipe part extending along the joint of the offshore installation.

According to the invention, the offshore installation comprises a base carrying at least one fluid conduit and adapted to be placed on the sea bottom, an oblong structure adapted to be substantially vertically positioned in the water, a joint interconnecting said base and the lower end of said structure in a manner allowing the structure to sway in the water when the base is placed on the sea bottom, at least one substantially straight pipe coupled at one end thereof to the fluid conduit of the base and extending upwards substantially parallel to the structure, and support means to restrict lateral displacements of the pipe with respect to the structure, wherein the lowermost support of the support means is constituted by a guide sleeve that is situated at a level above the joint and allows at most a 3° deviation between the central axis of the sleeve and the central axis of the pipe.

The offshore installation may comprise a connector means adapted to connect the structure to said base, said connector means comprising the joint provided with an upper coupling means carrying the guide sleeve and being adapted for coupling the joint to the lower end of the oblong structure, and with a lower coupling having a frame fixed thereto and being adapted for coupling the joint to the base, said connector means further comprising a pipe section forming part of the pipe and rigidly connected at one end thereof to the frame and near the other end thereof passing through the sleeve, the pipe section being provided with means for coupling the pipe section at the lower end thereof in fluid connection with the fluid conduit of the base, and with means for coupling the pipe section at the upper end thereof in fluid connection with the remaining part of the pipe.

As will be shown hereinafter with reference to the drawings, the pipe in the novel offshore installation will, by the presence of the guide sleeve, be forced in such deflection shapes during swaying of the structure, that bending stresses are created that are considerably lower than in the known offshore apparatuses that are not provided with such guide sleeve.

BRIEF DESCRIPTION OF THE DRAWING

The invention will now be described by way of example in greater detail with reference to the drawings which show some embodiments of the invention.

FIG. 1 of the drawings shows schematically a side view of an offshore installation according to the invention, wherein the oblong structure is formed by a tower.

FIG. 2 shows a cross-section of the installation of FIG. 1 taken over section II—II.

FIG. 3 shows detail III of the installation of FIG. 1 on a larger scale.

FIG. 4 shows the bending line of a pipe when the oblong structure of the apparatus according to the invention has an offvertical position.

FIG. 5 shows schematically a side view of an offshore installation provided with a connector means, this connector means being in the stage of being landed on the base.

FIG. 6 shows the installation of FIG. 5 in the next stage of assembly thereof.

FIG. 7 shows schematically a side view of an offshore installation similar to the one shown in FIG. 5, apart from the shape of the pipe sections of the connector means.

DESCRIPTION OF A PREFERRED EMBODIMENT

Figure 8:
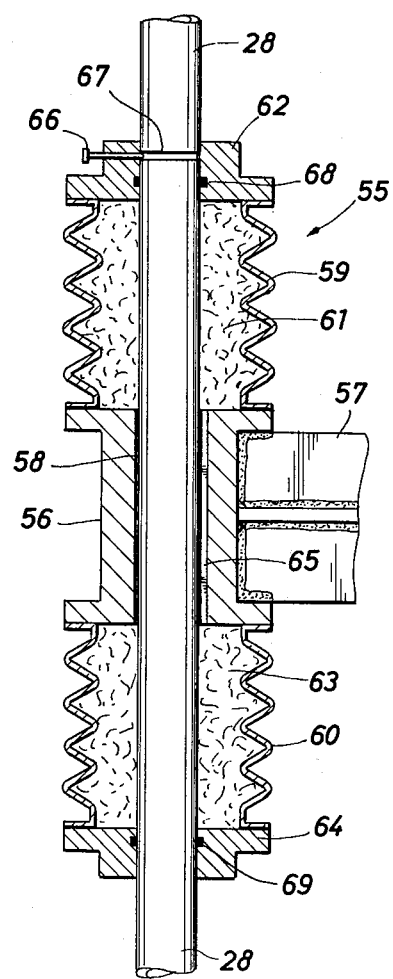
FIG. 8 shows schematically on a larger scale an alternative construction of the guide sleeve used in the installation of FIGS. 5, 6 and 7.

The offshore installation of FIG. 1 comprises a base 1, a tower 2, and a joint 3 interconnecting the base and the tower. The base 1 is placed on the seabottom 4 and anchored thereto by means of piles 5. The joint 3 may be of any design suitable for allowing the tower 2 to sway in the water when the base 1 is firmly attached to the seabottom 4. Designs of such joints are known (such as flexible joints, universal joints, gimbal joints) and a plurality thereof are particularly constructed for this type of underwater operations.

Fluid conduits 6 that are located on the seabottom for the greater part of the lengths thereof (not shown in the drawing) end in the base 1 and are each provided at the end thereof with a coupling means 7 preferably of the remote-control type. Each coupling means 7 faces upwards and is adapted to co-operate with the lower end of one of the pipes 8 as will be explained hereinafter.

The tower 2 is an oblong open framework structure which is provided with buoyancy means 9 which maintain the tower in the water in a substantial vertical position. The top of the tower 2 supports a platform 10 carrying fluid treating equipment 11, which equipment is connected by flexible conduits 12 to the upper ends of the pipes 8. The pipes 8 are arranged parallel to the tower 2 and are supported against lateral displacements with respect to the tower by sleeve-type support means or pipe-restraining collars 13 that are connected to the tower by arms 14 that are located at regular distances from each other in a vertical sense. These distances are chosen such so as to prevent buckling of the pipe. The support means have a relatively small height (equal to about half the outer diameter of the pipe passing therethrough and a relatively large internal diameter (about 1.5 times the outer diameter of the pipe passing therethrough). They have a flared upper end which is designed to catch the lower end of a pipe 8 when the latter is lowered from the platform. Each pipe 8 consists of a plurality of pipe sections that are connected together in end-to-end relationship (such as by screw-joints). Each pipe 8 is lowered to pass through all the pipe support means 13 until the lower end of the pipe is in coupling contact with the coupling means 7 at the end of the conduit 6 with which it should communicate. The lower end of the pipe 8 may be provided with coupling means such as annular grooves (not shown) in the outer wall thereof, that can cooperate with the coupling means 7 and the coupling action is performed by remote control. Such remote-controlled pipe coupling means are known per se, and do not need any detailed description thereof.

The lower ends of the support means 13 are also flared to allow the couplings between the pipe section to pass when the pipes 8 are being removed in upward direction.

It is important to note that the lowermost support means for each pipe 8 differs from the other support means. Such lowermost support means 15 is designed as a guide sleeve, and is shown in detail in FIG. 3 of the drawings. The sleeve allows a maximal deflection (indicated by A in FIG. 3) of 3° between the central axis of the pipe 8 passing therethrough and the central axis of the sleeve. The sleeve is provided with a conical entry 16 allowing an easy entry of the lower end of the pipe 8 when the latter is being lowered to its final position as shown in FIG. 1. It will be appreciated that the (not shown) coupling means carried by this lower end is of a size allowing the passage thereof through the interior of the sleeve 15. Each sleeve 15 together with the entry funnel 16 thereof is connected to the tower 2 by means of an arm 17 rigidly attached thereto, such as by welding.

The function of the guide sleeve 15 will now be explained with reference to FIG. 4. In this figure, all items are only schematically indicated. The flexible joint 3' that interconnects the base 1' and the tower 2' allows the tower to obtain the position as shown, in which the central axis of the tower deviates an angle $\phi$ from the central axis of the base. In this position, the pipes 8' are subjected to a bending stress over the part thereof that is situated alongside the flexible joint. Each pipe 8' is clamped at the lower end to the base 1' by the coupling means 7 as shown in FIG. 1, which maintain the ends of each pipe in a vertical position (rotation free, if desired). Each pipe is further guided through a guide sleeve 15', which maintains the central axis of the pipe part passing therethrough substantially parallel to the central axis of the tower 2'. As has been observed already earlier, each guide sleeve 15' is of an internal diameter and/or length and/or configuration allows at most a 3° deviation of the axis of the pipe from the axis of the sleeve. (see angle A in FIG. 3).

It can be calculated that the maximum bending moment $M_{max}$ in a pipe 8' when being curved in the position shown in FIG. 4 by the action of a guide sleeve 15' which allows no deviation between the axis of the pipe 8' and the axis of the sleeve, will be $$M_{max} = \frac{EI\phi}{1} \quad [\text{Force}(F) \times \text{Length}(L)] \tag{I}$$

wherein

E = modulus of elasticity of the material of the pipe 8' [F×L$^{-2}$]

I = moment of inertia of the effective cross section of the pipe 8' [L$^4$]

$\phi$ = angle between the central axes of the base 1' and the tower 2' [radians]

l = unsupported length [L] of the pipe 8' between the base 1' and the guide sleeve 15' in formulaes I and II. Also, in formulae II, l = distance between guide sleeve 15 and the adjoining support means 13', as well as between adjacent support means 13'.

In case the sleeve 15' would not be present, and be replaced by a support means similar to the support means 13' that support the pipe to prevent lateral movements of the pipe with respect to the tower 2', the pipe would have assumed a curved position as indicated by the dash-dot line in FIG. 4. The maximum bending moment would then have been $$M_{max} = 1.27 \frac{EI}{1} \ [F \times L] \tag{II}$$

Thus, the load to which each pipe is subjected by the swaying movements of the tower can be reduced for about 21% by using a guide sleeve 15 instead of a shorter support means 13 for the lowermost support of the pipe. It will be appreciated that this lowermost support formed by the guide sleeve 15 should be situated at a level above the joint 3 as shown in the drawings. Good results will be obtained if the joint is located at a level approximately halfway between the levels of the guide sleeve and the coupling interconnecting the pipe and the fluid conduit of the base.

In placing the offshore installation of FIG. 1, the base 1 is placed on the seabottom 4 and anchored thereto by means of the piles 5. The tower 2 and the joint 3 may be connected to the base 1 during these operations, or be coupled to the base after the latter has been anchored to the sea bottom. The same applies for the platform 10.

Thereafter, the buoyancy of the buoyancy means 9 carried by the tower 2 is adjusted in order to control the maximum allowable sway of the tower 2. Subsequently, a pipe 8 is lowered from the platform 10, this pipe carrying coupling means at the lower end thereof that are adapted to operate with the coupling means 7 of the fluid conduit 6 with which the pipe 8 is to be brought into communication. The coupling means at the lower end of pipe 8 passes consecutively through all the support means 13 having flared entries and through the guide sleeve 15 having a conical entry 16. The central axis of the support means 13, the guide sleeve 15 and the coupling means coincide (when the tower 2 is in vertical position), and the coupling means at the lower end of the pipe 8 will finally enter the coupling means 7 from the top, which coupling means will then be actuated by remote control means. It will be appreciated that since the central axis should coincide, the flexible joint 3 is preferably designed such that the parts thereof cannot rotate with respect to each other around the central axis. The coupling means 7 should preferably be provided with conical entrances to facilitate the lower end of each pipe 8 to enter the coupling means even if the tower 2 is swaying around the vertical position.

After the pipes 8 have been coupled with the lower ends thereof to the coupling means 7 of the fluid conduits 6, the upper ends thereof are coupled to the flexible tubes 12 that are in communication with the equipment 11 on the platform 10. The conduits 6 may lead from underwater wells (not shown) to the base 1. In an alternative arrangement, one of the conduits 6 may extend between the base and a shore station, or between the base and a marine loading station.

Reference is now made to FIGS. 5 and 6 of the drawings which show another embodiment of the invention. In this embodiment, a connector means 20 is arranged between the base 21 and the oblong structure 22. The oblong structure 22 in this embodiment is constituted by a flow conduit of larger cross-sectional dimensions than the pipes 23 that are arranged substantially parallel to the longitudinal axis of the structure 22. The oblong structure 22 is supported in a vertical position by the semi-submersible platform 24 that is floating at the water-level 25.

The connector means 20 consists of a frame in the form of an auxiliary base member 26, a flexible joint 27, pipe sections 28, sleeve guide means 29, and a pair of cable guides 30. The lower ends of the joint 27 and the pipe sections 28, as well as the cable guides 30 are firmly attached to the auxiliary base member 26. The guide means 29 is firmly attached to the upper end of the flexible joint 27.

The flexible joint 27 carries coupling means at both ends thereof. The lower coupling means 31 is adapted to cooperate with the coupling means 32 of the conduit 33. The coupling means 32 is supported by the base 21, and the conduit 33 is situated on the ocean bottom 34 and leads to a shore station (not shown). The upper coupling means 35 of the flexible joint 27 is adapted to be coupled to the coupling means 36 at the lower end of the oblong structure that is constituted by the conduit 22 in the present embodiment.

The pipe sections 28 are firmly attached near the lower ends thereof to the auxiliary base member 26, and are each guided near the upper end thereof by a guide sleeve 37. Each guide sleeve 37 allows only a small (less than 3°) deviation between the central axis of the pipe section 28 passing therethrough and the central axis of the sleeve. The guide sleeves 37 form part of the guide sleeve means 29 that is firmly attached to the upper part of the flexible joint 27. Both ends of each pipe section 28 carry a coupling means. The lower coupling means 38 is adapted to cooperate with the coupling means 39 of one of the conduits 40. The coupling means 39 are supported by the base 21, and the conduits 40 are situated on the ocean bottom 34 and lead to underwater wells (not shown). The upper coupling means 41 of each of the pipe sections 28 is adapted to be coupled to the coupling means 42 of the lower end of one of the pipes 23. The coupling means 31, 32; 35, 36; 38, 39; and 41, 42 can be operated by remote control means which are (just as the coupling means) known per se and therefore do not need any further detailed description thereof.

The base 21 is anchored to the ocean bottom 34 is one of the manners known per se (not shown in the drawing). The base 21 has two guide posts 43 firmly attached thereto, each of which posts is connected to the semi-submersible platform 24 by means of a guide cable 44 that is kept in a taut position in a manner known per se. The cables 44 pass through the cable guides 30 of the connector means 20 and guide the connector means onto the base 21 when the means are being lowered towards the oceanbottom 34. The cables 44 further cooperate with the cable guides 45 (see FIG. 6) that are firmly attached to the lower end of the pipe 22 to guide this pipe when being lowered, to a position wherein the coupling means 36 thereof will be in coupling contact with the coupling means 35 of the connector means 20.

Support means 46 are carried by the pipe 22 at regular distances from one another. These support means are firmly attached to the pipe 22 and the guides 47 thereof support the pipes 23 (when in a position parallel to the pipe 22) against excessive lateral movements with respect to the pipe 22 so as to obviate buckling of the pipes 23 when axially loaded. The guides 47 have flared entries that allow a pipe 23 to be lowered alongside the pipe 22, thereby passing consecutively through all the guides that are arranged at one side of the pipe 22. It will be appreciated that the guides are installed such that the central axis of the guides at one side of the pipe coincide.

The method in which the offshore installation of FIGS. 5 and 6 will be mounted on the ocean bottom, will now be described.

The base 21 is anchored to the ocean bottom 34 (see FIG. 5) and the connections with the conduits 33 and 40 are made. The guide cables 44 are made to extend upwards to the semisubmersible platform 24, from which the operations take place. Subsequently, the connector means 20 is lowered along the guide cables 44 (which pass through the cable guides 30) onto the base 21. Such lowering may take place by any one of the techniques known for this purpose, such as by means of a cable (not shown) that is releasably attached to the coupling means 35 of the connector means 20.

The cable guides 30 finally slide over the guide posts 43 of the base 21, and the coupling means 38 and 31 enter the matching coupling means 39 and 32. Subsequently the remote control means of these coupling means are actuated, whereafter the flexible joint 27 and the pipe sections 28 are in fluid communication with the conduits 33 and 40, respectively, and the connector means 20 is firmly attached to the base 21. Thereafter the cable by which the connector means 20 has been lowered is released from the coupling means 35 and retrieved to the semisubmersible platform 24.

In the next stage of the operation, the pipe 22 (see FIG. 6) is lowered onto the connector means 20. The pipe 22 consists of a plurality of pipe sections that are screwed or welded together in end-to-end relationship on top of the pipe 22 when the latter is being lowered from the platform 24. During the lowering operation, the lower end of the pipe is guided by the cable guides 45 attached thereto, which cable guides cooperate with the cables 44. At regular distances from each other, the support means 46 are attached to the pipe 22 (such as by welding) in a manner such that the central axes of the guides 47 at each side of the pipe 22 coincide. The distances between adjacent support means 46 is chosen so as to prevent buckling of the pipes 23 (that are finally being installed alongside the pipe 22) when these latter pipes are axially loaded. The guides 47 of the support means 46 have a sufficiently large inner diameter to allow the pipes 23 to be passed therethrough.

The pipe 22 is lowered over a distance at which the lower end thereof carrying the coupling means 36 is in contact with the coupling means 35 of the connector means 20. The means 35, 36 are subsequently coupled by remote control action, and the upper end of the pipe 22 is suspended from the platform 24 by heave compensation means (not shown) known per se that support the pipe 22 without overloading it when the platform 24 that buoyantly supports the pipe is heaving as a result of wave and/or tidal action. The upper end of the pipe 22 is brought into fluid communication with equipment (not shown) mounted on the platform 24, which equipment is designed for handling and treating oil and gas recovered from wells.

Finally, the pipes 23 are lowered from the platform 24 through the two sets of coaxially arranged guides 47 of the support means 46 carried by the pipe 22. The pipes 23 consist of sections that are screwed or welded in end-to-end relationship when the pipes are being lowered. The pipes are lowered until the lower ends thereof carrying the coupling means 42 contact the coupling means 41 whereafter these means are coupled by remote control action. The pipes 23 are subsequently supported from the platform 24 in a suitable manner, such as by heave compensation means, and the upper ends thereof are brought into communication with the equipment (not shown) on the platform, which equipment is in fluid communication with the pipe 22.

Fluid (such as oil and gas) recovered from a plurality of submerged wells (not shown) now flows through the conduits 40, subsequently passes through the pipe sections 28 and the pipes 23 and then enters the handling and treating equipment mounted on the platform 24. After being treated, the fluid is guided into the pipe 22. It flows downwards and passes via the flexible joint 27 into the conduit 33 which leads the fluid to a shore station (not shown).

Wind and waves acting on the semisubmersible platform 24 will laterally displace this platform as a result of which the pipe 22 will be subjected to a swaying action. Such action is allowed by the connector means 20 that flexibly interconnects the pipe 22 and the base 21. Flexing of the means 20 forces the pipe sections 28 to obtain a curved position, which position is defined by the sway angle and the guide sleeves 37 as well as the non-flexible connection between the lower ends of the pipe sections 28 and the base 21. The pipe sections 28 thereby obtain a curvature similar to those of the pipes 8' as shown in FIG. 4, whereby a relatively low maximum bending moment is exerted on these pipe sections. It will be appreciated that the bending moments exerted in the pipe sections will vary in value and direction as a result of the swaying action of the pipe 22, but that the maximum value thereof is limited by the connector means 20 to a relatively low value.

Compared to prior art constructions, the connector means 20 of the invention will have the pipe sections 28 thereof subjected to a relatively low bending stress, which will greatly increase the lifespan of the novel construction.

It will be appreciated that the upper ends of the pipe sections 28 slide through the guide sleeves 37 which remain immobile with respect to the upper part of the flexible joint 27. Each guide sleeve maintains the central axis of the pipe part passing therethrough approximately parallel to the central axis of the sleeve, and the pipe parts passing through the sleeve are consequently maintained approximately parallel to the central axis of the upper part of the flexible joint 27. If angles over 3° deviation would be allowed between the axes of each of the pipes 23 and the upper part of the flexible joint 27, the line of curvature of the pipe sections 28 would become similar to the dash-dot line of curvature shown in FIG. 4, whereby a large undesired bending moment would be generated in the sections.

The pipes 23 will slide freely through the guides 47 of the support means 46 when the central pipe 22 is subjected to a swaying action. It will be appreciated that the internal diameters of the guides 47 are considerably larger than the outside diameter of the pipes 23, such in order to reduce the friction forces exerted on the pipes 23 that will axially load the pipes spans between the guides 47 thereby decreasing the tendency of the pipes to buckle.

Since the cross-sectional area of the flexible part of the flexible joint 27 is relatively large, the distance between the central axes of the pipe sections 28 and the flexible joint 27 is larger than required between the central axes of the pipes 23 and the pipe 22. If desired, the upper ends of the pipe sections may thereto be double-curved as indicated in FIG. 7 which shows an offshore installation equal to the one shown in FIG. 6, apart from the pipe sections 50 that are provided with a double-curved section 51, and the support means 52 that are smaller than the corresponding support means 46 applied in the installation of FIG. 6.

It will be appreciated that the offshore installations as shown in FIGS. 1 and 6 of the drawings may in a slightly modified form be used for carrying out drilling operations. The equipment carried on the platform 10

(FIG. 1) and the semi-submersible 24 (FIG. 6) is then replaced by a drilling rig, having a rotary table thereof arranged coaxially with one of the pipes 8 (FIG. 1) and with one of the pipes 23 (FIG. 6). Drilling equipment is then passed through the pipes 8 (FIG. 1) and the pipes 23 (FIG. 6) that are formed by conductor pipes. The conductor pipes are at the lower ends thereof coupled to the entries of underwater boreholes that extend downwards from the couplings 7 (FIG. 1) and the couplings 39 (FIG. 6). The pipes 6 (FIG. 1) and 40 (FIG. 6) are replaced by casings that extend from the couplings 7 (FIG. 1) and 39 (FIG. 6) downwards into the sea- or ocean bottom.

Although the two embodiments shown in the drawing each show only two pipes that run parallel to the oblong structure, it will be appreciated that the invention may be applied in any offshore apparatus of the type shown and having any number of pipes arranged around the oblong structure.

The guidelines 44 used in the installation of FIG. 5 to guide the connector means 20 to the base 21, and to guide the pipe 22 to the connector means 20 may be replaced by any one of the base-finding systems that are known for this purpose. Such systems include apparatuses that detect the position of an underwater body by means of acoustic wave signals.

Reference is now made to FIG. 8 showing a longitudinal section of an alternative construction of the guide sleeve 37 shown in FIGS. 5-7. The guide sleeve 55 comprises a bearing body 56 that is connected via an arm 57 to the upper part of the flexible joint (not shown). The bearing body 56 has a close-fit passage 58 through which the pipe section 28 passes. The passage allows a maximum deviation between the axis of the section 28 and the axis of the bearing body 56, which deviation is less than 3°.

The bearing body 56 carries bellows 59 and 60 at its top and bottom end, respectively. The top bellows 59 encloses a space 61 in combination with the ring member 62 and the bearing body 56. The bottom bellows 60 encloses a space 63 in combination with the ringmember 64 and the bearing body 56. The spaces 61 and 63 are filled with grease and communicate with each other via channel 65 (which may have a screw-line form) arranged in the wall of the passage 58. The ring member 62 is clamped on the pipe section by screws 66 cooperating with an annular groove 67 in the outer wall of the pipe section 28. The annular spaces between the ring members 62, 64 and the outer wall of the pipe section 28 are sealed off by O-seals 68 and 69, respectively. The bellows 59 and 60 are at their ends fluid tightly connected in a suitable manner to the ring members 62, 64 and the bearing body 56 as shown in the drawing.

Means for filling the spaces 61 and 63 with fresh grease may be arranged. Such means are known per se and therefore not shown in the drawing.

It will be appreciated that the use of the guide sleeve 55 shown in FIG. 8 will greatly reduce the friction between the pipe section 28 and the guide sleeve, and will increase the operational life-span of the installation according to the invention. The use of the connector means 20 shown in FIGS. 5-6 allows the application of such guide sleeve 55, since the sleeve forms an integral part of the connector means, and therefore can be mounted on the base 21 together with the pipe section 28.

Figure 9:
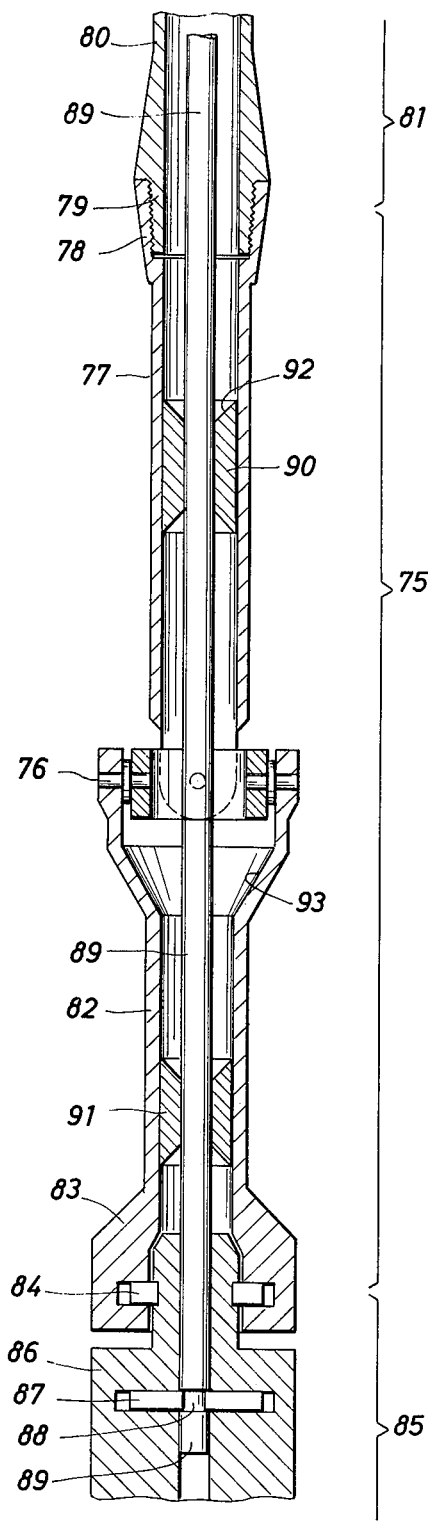
FIG. 9 shows schematically a longitudinal section of an embodiment of the invention, wherein the pipe is arranged in the interior of the oblong structure.

Still another embodiment of the invention is shown in FIG. 9 of the drawings. The connector means 75 is designed for coupling a base to an oblong structure thereby allowing the pipe to pass through the interior of the oblong structure and the joint interconnecting the base and the structure.

The joint 76 of the connector means 75 is a gimbal-type joint of known design. The upper part of the connector means 75 is formed by a pipe section 77 carrying a box-screw thread 78 at its upper end, said screw thread being in cooperative engagement with a pin-screw thread 79 of a pipe section 80. The latter pipe section forms an oblong structure 81 (only partly shown in the drawing) in combination with a plurality of identical pipe sections (not shown), which structure 81 extends in a substantial vertical direction and is supported near the upper end thereof by suitable buoyancy means, such as a floating platform (not shown).

The lower part of the connector means 75 is formed by a pipe section 82 that carries coupling means 83 with remotely controlled locking dogs 84 at its lower end. The locking dogs 84 cooperate with an annular groove arranged in the outer wall of the base member 85 (base member 85 being only partly shown in FIG. 9). The base member 85 carries coupling means 86 with remotely controlled locking dogs 87, which latter are designed to cooperate with an annular groove 88 that is arranged in the outer wall of the lower end of a pipe 89 that extends from the floating platform (not shown) supporting the oblong structure 81 down to the base member 85. As shown in the drawing, the pipe 89 extends through the interior of the oblong structure 81 of which the pipe section 80 forms the lowermost section, and through the interior of the connector means 75.

It will be appreciated that the part of the pipe 89 extending through the interior of the oblong structure 81 is laterally supported by the inner wall of the structure to restrict lateral movements of the pipe with respect to the oblong structure. The inner wall of the structure forms the support means for the pipe. If desired, however, separate support means may be mounted within the pipe sections 80 forming the oblong structure 81.

Where passing through the connector means 75, however, the pipe 89 is guided through two guide sleeves 90 and 91. The guide sleeve 90 is mounted within the pipe section 77 that forms the upper part of the connector means 75. The sleeve 90 has a conically shaped upper entry 92 that is designed to allow the lower end of the pipe 89 to enter the sleeve when the pipe 89 is being installed. The sleeve 90 and the pipe 89 show a close fit, allowing a deviation between the axes of the pipe 89 where passing through the sleeve, and the sleeve 90 that is not more than 3°, and preferably less than 1°.

The sleeve 91 may be equivalent to the sleeve 90 and the combination of sleeves 90, 91 will bend the pipe 89 in a curve when the oblong structure 81 is swaying in the water, at which minimum stresses will be generated in the pipe.

It will be appreciated that the installation shown in FIG. 9 will be mounted in two parts. The oblong structure 81 carrying the connector means 75 is guided to the base member 85 that is already installed on the sea bottom. The connector means 75 is guided to the base in one of the manners known per se in offshore operations. After the lower coupling means 83 of the connector means 75 have been coupled to the base member 85, the pipe 89 is lowered through the oblong structure 81. The pipe 81 may be composed of a plurality of sections that are interconnected one to another during the lowering operation. The lower end of the pipe 89 finally enters the guide sleeve 90 and subsequently passes through the interior of the gimbal joint 76. The lower end of the pipe 89 is then guided into the lower part 82 of the connector means 75, by means of the conical inner wall 93 of said lower part 82. After being passed through the lower guide sleeve 91, the lower end of the pipe 89 enters the base 89 and is finally locked therein by the locking dogs 87 of the coupling means 86.

It will be understood that the offshore installation of FIG. 9 may be used for many different purposes, such as for drilling and underwater well through the pipe 89 followed by production of fluids through said pipe, or for anchoring a tanker or other vessel at the oblong structure and pumping fluids to or from said tanker via the pipe 89.

It will be appreciated that although the lower parts of the pipes as applied in the embodiments described and shown, are guided through guide sleeves comprising an uninterrupted cylindrical surface enclosing the relevant outer surface of the pipe, the invention is not limited to this particular construction of the guide sleeve. If desired, the sleeve may be composed of a plurality of cylindrically shaped elements that are co-axially arranged at relatively small distances from one another, the combination of elements being arranged to allow the central axis of the pipe to deviate at most 3° from the central axis of the elements.

Finally it is observed that the connector means such as 20 (FIG. 5) and 75 (FIG. 9) as used in the installation according to the invention, are of relatively restricted length and can easily be handled during the installation thereof by vessels that are normally applied for installation of underwater oblong structures. One of the advantages of such connector means is further that the upper coupling means of the pipe sections thereof have their central axis substantially parallel to the axes of the super-imposed support means, even if the oblong structure is swaying. Thus, the pipes can be easily stabbed in the coupling means of the sections, even under rough weather conditions.

We claim as our invention:

1. Offshore installation comprising a base carrying at least one fluid conduit and adapted to be placed on the sea bottom, an oblong structure adapted to be substantially vertically positioned in the water, a joint interconnecting said base and the lower end of said structure in a manner allowing the structure to sway in the water when the base is placed on the sea bottom, at least one substantially straight pipe coupled at one end thereof to the fluid conduit of the base extending upwards substantially parallel to the structure, and a plurality of supports forming support means between the pipe and the structure to restrict lateral displacements of the pipe with respect to the structure, wherein the lowermost support of the support means is constituted by a guide sleeve that is situated at a level above the joint and is of a length greater than the support means above said sleeve and is of an internal diameter to allow up to 3° deviation between the central axis of the sleeve and the central axis of the pipe.

2. Offshore installation according to claim 1, wherein the guide sleeve allows up to a 1° deviation between the central axis thereof and the central axis of the pipe.

3. Offshore installation according to claim 2, wherein the guide sleeve includes friction reducing means for reducing the friction between the pipe and the sleeve.

4. Offshore installation according to claim 1 wherein the joint is located at a level approximately midway between the levels of the guide sleeve and the coupling interconnecting the pipe and the fluid conduit of the base.

5. Offshore installation according to claim 1 wherein the pipe comprises a single section extending from the base to a level above the guide sleeve, and releasable coupling means for connecting the upper end of this section with the remaining part of the pipe.

6. Offshore installation according to claim 1, including connector means adapted to connect the structure to the base, said connector means comprising the joint which is provided with an upper coupling means carrying the guide sleeve and being adapted for coupling the joint to the lower end of the oblong structure, and with a lower coupling having a frame fixed thereto and being adapted for coupling the joint to the base, said connector means further comprising a pipe section forming part of the pipe and rigidly connected near the lower end thereof to the frame and near the upper end thereof passing through the sleeve, the pipe section being provided with means for coupling the pipe section at the lower end thereof in the fluid connection with the fluid conduit of the base, and with means for coupling the pipe section at the upper end thereof in fluid connection with the remaining part of the pipe.

7. Offshore installation according to claim 6, wherein the sleeve includes sealing means for sealing the space between the sleeve and the pipe section passing therethrough from the exterior of the sleeve.

8. Offshore installation according to claim 7, wherein the said space is filled with a lubricant.

9. Offshore installation according to claim 6, wherein a fluid passage is formed through the oblong structure, the joint and the coupling means thereof, and the base.

10. Offshore installation according to claim 1, wherein the uper end of the oblong structure is connected to a floating platform or vessel, and the upper end of the pipe includes flexible tubing forming a fluid connection to the platform or vessel.

11. Offshore installation according to claim 1, wherein the joint comprises a central passage therethrough, and wherein the pipe passes through this central passage and through the interior of the oblong structure.

* * * * *